March 17, 1942. E. S. GUTTMANN 2,276,302
MEASURING DEVICE
Filed Oct. 11, 1939  6 Sheets-Sheet 3
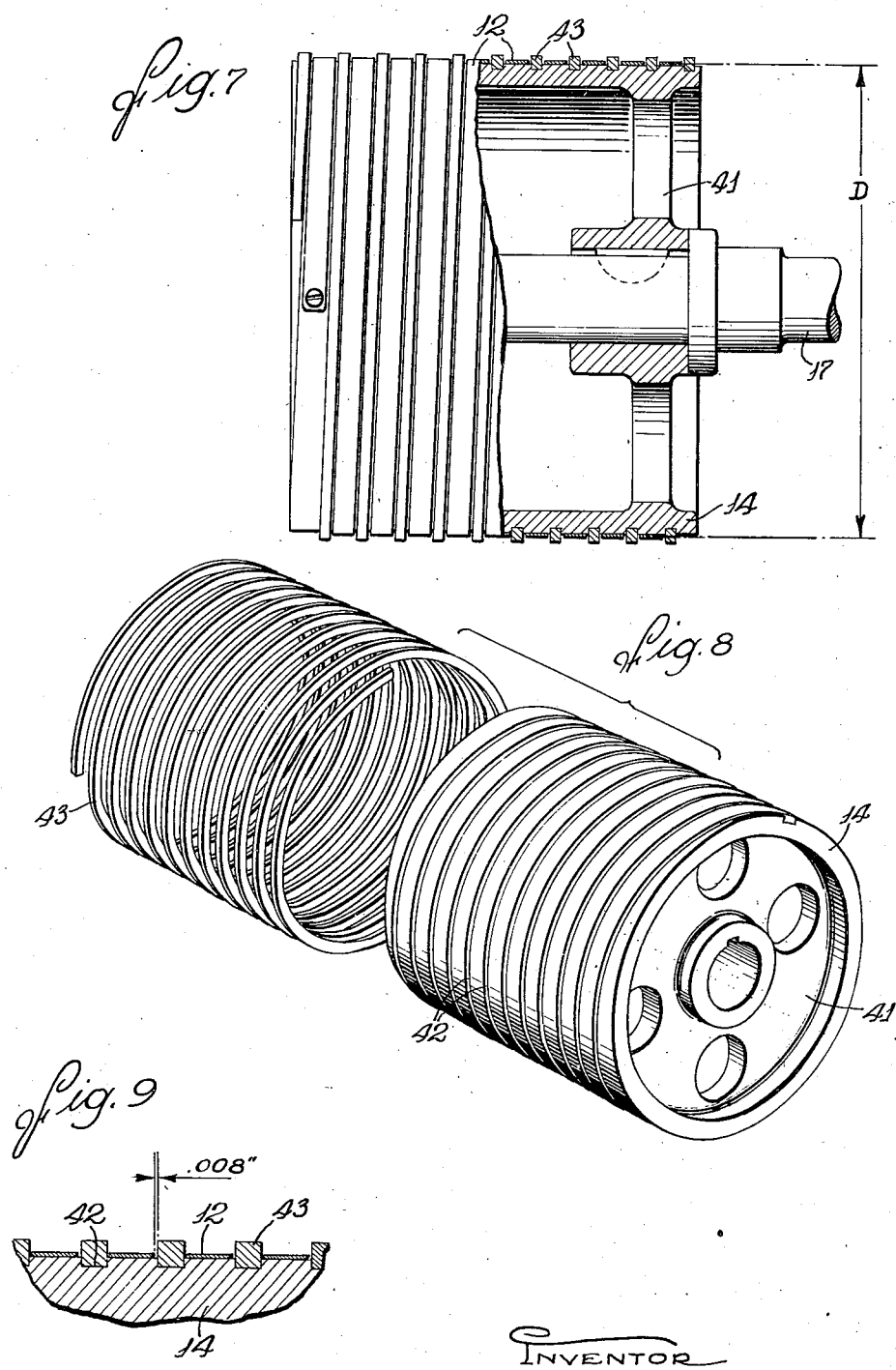
INVENTOR
Eric S. Guttmann
By Parker, Carlson, Pitzner & Hubbard
ATTORNEYS March 17, 1942.  E. S. GUTTMANN  2,276,302
MEASURING DEVICE
Filed Oct. 11, 1939  6 Sheets-Sheet 4
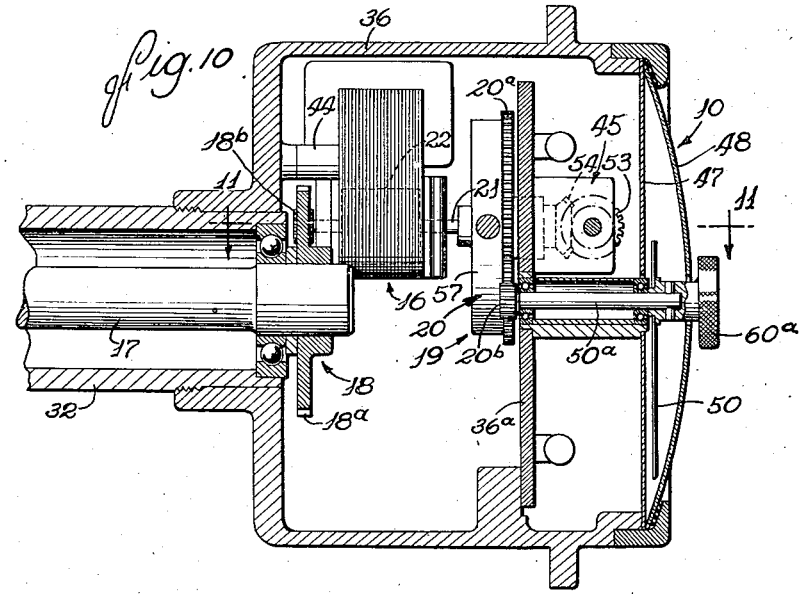
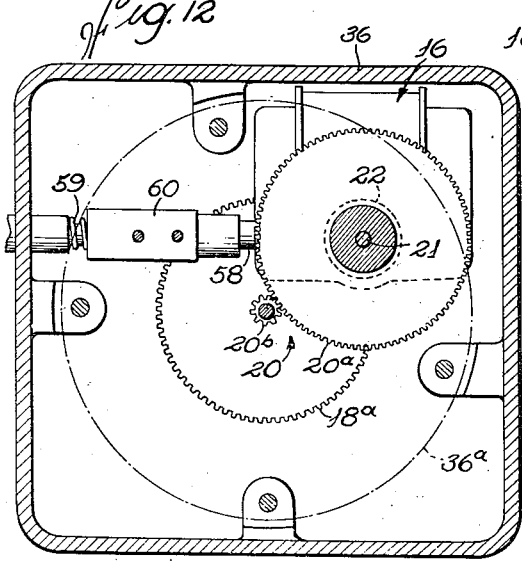
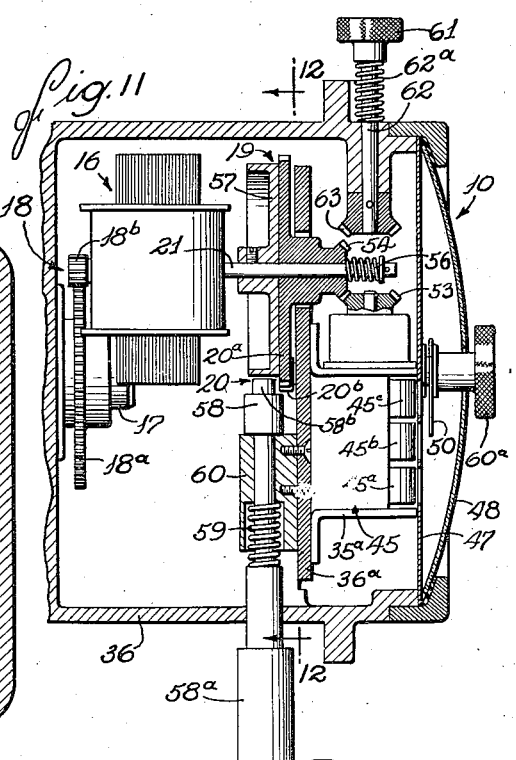
INVENTOR
Eric S. Guttmann
ATTORNEYS March 17, 1942.   E. S. GUTTMANN   2,276,302
MEASURING DEVICE
Filed Oct. 11, 1939   6 Sheets-Sheet 5

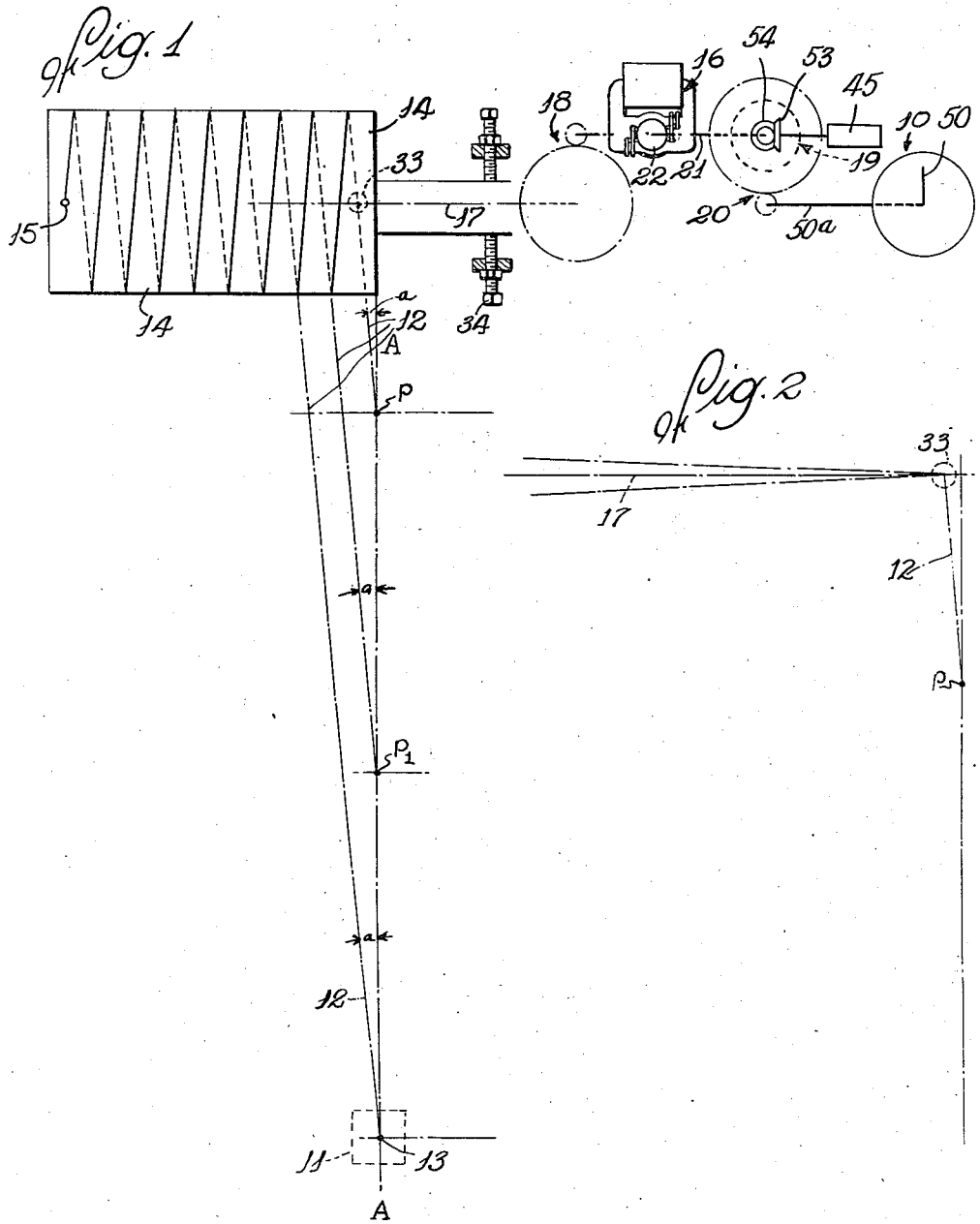

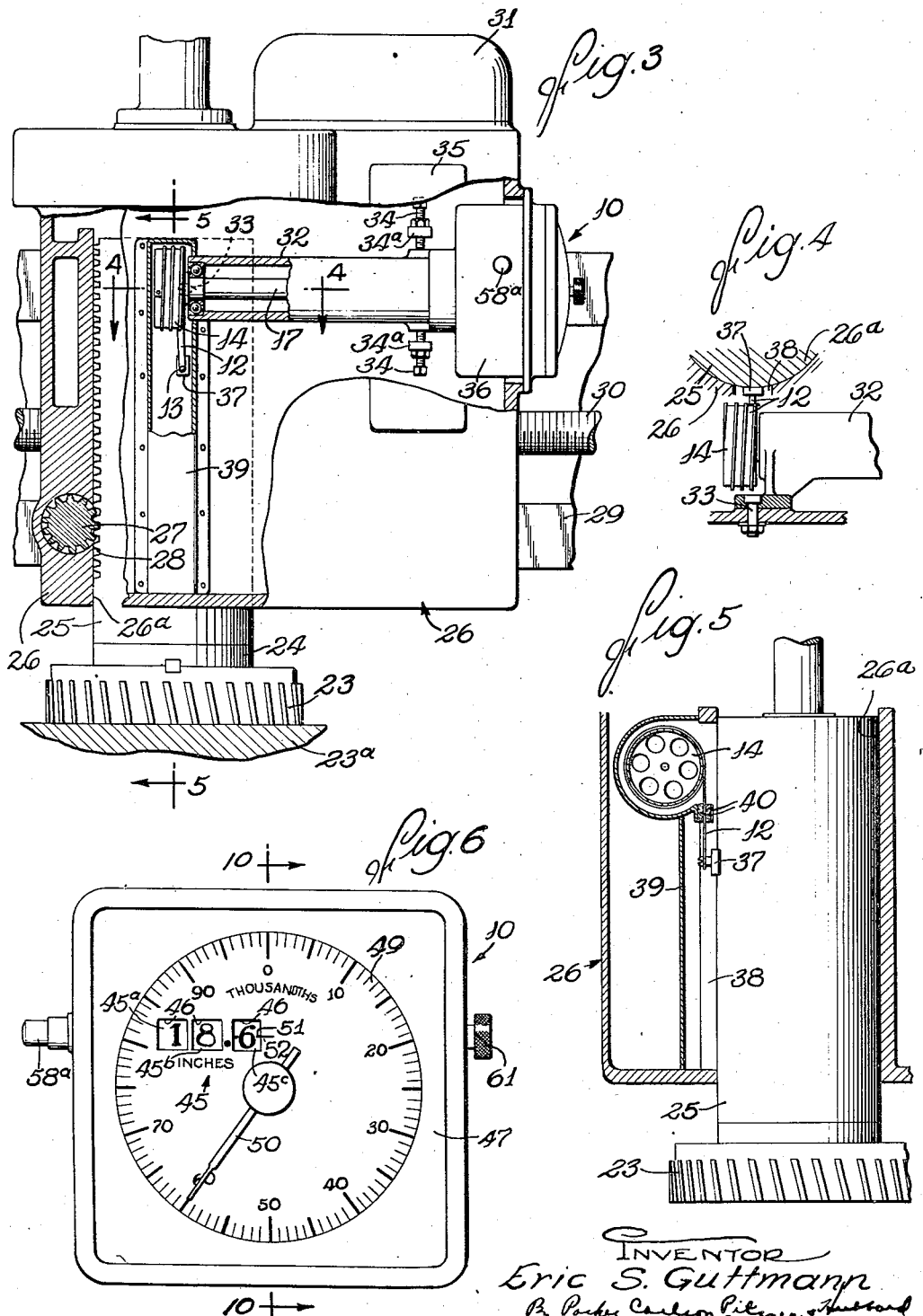

INVENTOR
Eric S. Guttmann
By Parker, Carlson, Pitzner & Hubbard
ATTORNEYS

March 17, 1942.  E. S. GUTTMANN  2,276,302
MEASURING DEVICE
Filed Oct. 11, 1939  6 Sheets-Sheet 6
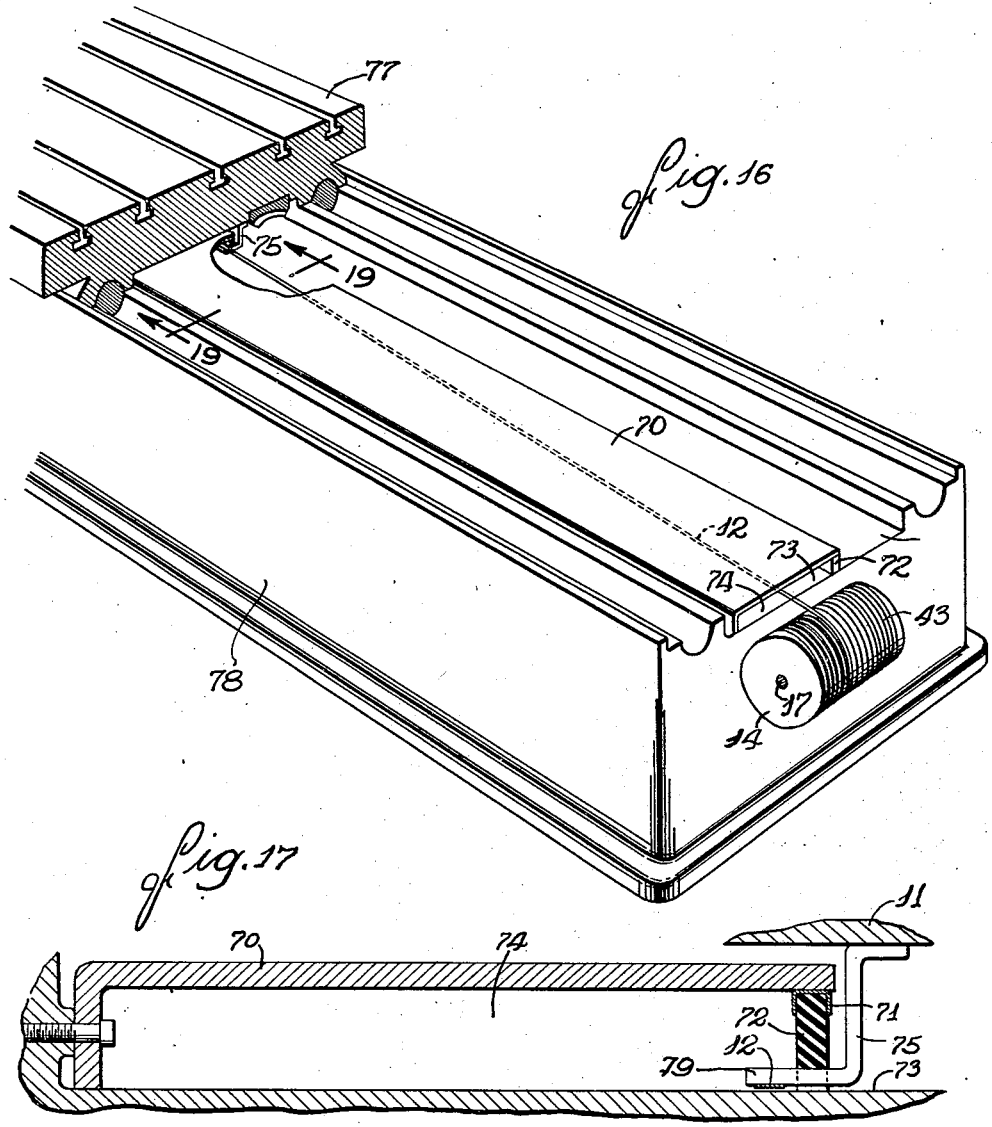
INVENTOR
Eric S. Guttmann
By Parker, Carlson, Pitzner & Hubbard
ATTORNEYS Patented Mar. 17, 1942

2,276,302

UNITED STATES PATENT OFFICE 2,276,302

MEASURING DEVICE

Eric S. Guttmann, Rockford, Ill., assignor to The Ingersoll Milling Machine Company, Rockford, Ill., a corporation of Illinois Application October 11, 1939, Serial No. 298,923

30 Claims. (Cl. 33—125)

The invention relates to a novel measuring device and more particularly to a device for making precision measurements over comparatively long ranges.

Johansson blocks are most commonly employed in making precise measurements of substantial lengths, that is, beyond the range of ordinary dial indicator gauges. These are arranged in an end to end series to make up approximately the total length to be measured. A micrometer gauge is placed at the end of the series of blocks to fill out the exact length. For each new length to be measured, another appropriate series of blocks must be selected and set up. Not only is this method cumbersome and slow, but, in addition, a large amount of mental calculation is entailed in adding up the separate components. Possibilities of error are great not only because of the computations involved but also because any grease or foreign matter sticking to the abutting block ends will result in a serious error.

The general aim of the present invention is to overcome the foregoing objections by providing a precision measuring instrument which affords an instantaneous and continuous indication of the displacement of a movable member with a high degree of accuracy, for example, a thousandth of an inch or less in the case of linear measurements. Accordingly, a measuring device embodying the present invention may be associated with a movable machine tool element and the operator need merely read the dial of the instrument to obtain at any time an accurate measure of displacement throughout a long range.

A more detailed object is to provide a measuring device involving a rotatable drum and a flexible element or line wound helically therearound with the drum and the unreeled portion of the element mounted and guided for relative movement in a manner such as to maintain a constant angular relation between the drum axis and the unreeled portion of the flexible element.

Another object is to provide a measuring device of the type described embodying a novel indicator adapted to be actuated continuously by a member which may be moved at a rapid traverse rate commonly used in machine tools without danger of damaging the indicator even though the latter is adapted to register such small increments as thousandths of an inch.

A further object is to provide for manually resetting of the indicator in a novel manner such as to avoid the introduction of an error incident to the making of a succession of measurements from a given reference point.

In a measuring device of the above character, the indicator is constructed for use with a drum precisely of given size and with a line of certain thickness. Any deviation from these exact dimensions will introduce an error in the indication and this error will accumulate throughout the operating range of the device.

Still another object of the invention is to correct for such errors and thus adapt the device for precise indication in spite of dimensional inaccuracies in the size of the drum and line.

A more detailed object is to provide for progressively changing the length of line paid out or reeled in per unit of the measured movement, the amount of such change corresponding in magnitude to the error due to said dimensional inaccuracies.

The invention also resides in the novel manner in which the compensating correction is introduced.

Another object is to provide a measuring device of the character embodying a novel arrangement including an electric motor for performing the dual functions of winding up the tape and eliminating backlash in the gears.

The invention also resides in the novel constructions which minimize the changes required to adapt the measuring instrument to widely varying ranges and which avoid the introduction of errors by the accumulation of foreign matter on the tape or drum.

Still another object is the provision of a unit embodying a novel form of take-up drum by means of which errors may be obviated which would otherwise result from changes in tape angle, tape tension, or both.

It is also an object to provide a novel drum construction by virtue of which extreme precision of dimensioning is combined with low cost of production.

Further objects and advantages of the invention will become apparent as the following description proceeds taken in connection with the accompanying drawings, in which .

Figure 1 illustrates diagrammatically a measuring device embodying the present invention.

Fig. 2 illustrates diagrammatically the operation of an adjustment mechanism included in the device in Fig. 1.

Fig. 3 is a front elevation partly in section of a milling machine head illustrating one adaptation of the invention.

Fig. 4 is a detail transverse sectional view along the line 4—4 in Fig. 3.

Fig. 5 is a vertical sectional view along the line 5—5 in Fig. 3.

Fig. 6 is a face view of the visual indicator.

Fig. 7 is a side elevation partly in section of the drum and tape unit.

Fig. 8 is an exploded perspective view of the drum.

Fig. 9 is a fragmentary longitudinal sectional view of the drum.

Fig. 10 is a longitudinal sectional view along the line 10—10 in Fig. 6.

Fig. 11 is a transverse sectional view along the line 11—11 in Fig. 10.

Fig. 12 is a transverse sectional view along the line 12—12 in Fig. 11.

Fig. 16 is a fragmentary perspective view illustrating the application of the measuring device to a machine tool work table.

Fig. 17 is an enlarged transverse sectional view along the line 19—19 in Fig. 16.

Figure 13:
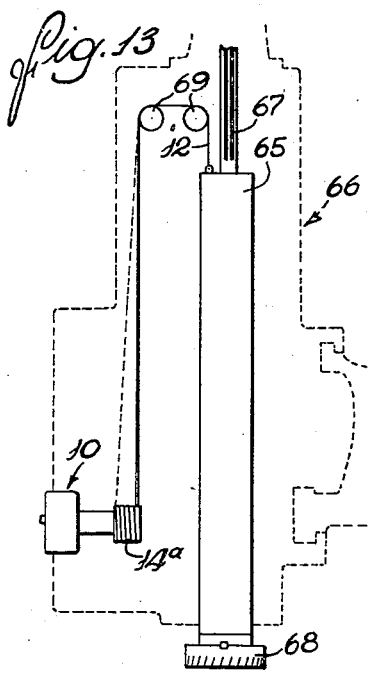
Fig. 13 illustrates diagrammatically the application to a machine tool head of a modified form of the measuring device.

While the invention is susceptible of various modifications and alternative constructions, I have shown in the drawings and will herein describe in detail the preferred embodiment, but it is to be understood that I do not thereby intend to limit the invention to the specific forms disclosed, but intend to cover all modifications and alternative constructions falling within the spirit and scope of the invention as expressed in the appended claims.

Since the measuring device herein disclosed is essentially a precision instrument, it is especially useful in connection with machine tools in view of the high accuracy of measurement demanded in their operation. Accordingly, the invention has been shown herein as applied to various forms of machine tools but it will be appreciated that measuring devices embodying the present invention are also susceptible of a wide variety of other applications.

*General arrangement of facts*

In the illustrated embodiment, the device constituting the present invention gives a continuous reading on a visual rotary indicator 10 (see Fig. 1) of the linear displacement, from a reference point P, of some movable member 11 along a predetermined path A—A. For this purpose, motion of the member 11 is transmitted to the indicator through an elongated element or line having one end attached to said member and connected to a rotary part which is geared in the proper ratios to the different parts of the indicator. Preferably, though not necessarily, the element comprises a flexible tape in the form of a very thin flat metal strip or ribbon 12 having its free end 13 fixed to the member 11, and the rotary part comprises a freely rotatable drum 14 around which the remainder of the tape is helically wound with its end anchored to the drum at 15. As shown, the drum axis is disposed substantially perpendicular to the rectilinear path in which the movable member 11 is guided and this path, for a reason to appear later, is disposed at one end of the tape helix. The drum 14 is rotatably biased in a direction to wind up the tape, in this instance by a torque motor 16 connected to the drum shaft 17 by a speed reduction gearing 18. The indicator is driven by the drum 14 through a clutch 19 and one part is driven through a gearing 20, which is connected through a shaft 21 with the gearing 18. A direct mechanical and permanently engaged driving connection is thus established between the movable member 11 and various parts of the indicator, the rotor of the torque motor 16 being fast on the shaft 21 so that the motor also serves to take up any backlash in the gears 18 and 20.

The ratios of the sets of gears 18 and 20 are so chosen, and the scale of the indicator 10 correspondingly calibrated, that the indicator will read directly in terms of linear displacement for the movable member 11. For purposes to appear later, the indicator is divided into two parts, one preferably being a wheel type counter for indicating primary units such as inches and also tenths of such units, the other being a dial type counter for indicating secondary units such as thousandths (see Fig. 6).

To simplify the calculations for the gear ratios in the instrument and its calibration, it is desirable that the arrangement for driving the drum 14 be such that a point on its periphery will move through a distance exactly equal to that moved by the member 11. This is to be contrasted with an arrangement in which instead of these distances being equal they are merely proportional, even though they bear a fixed ratio. To use a specific example, if the circumference of the drum 14 is ten inches, then the arrangement should be such that, in spite of the fact that the tape extends helically around the drum, the latter will make exactly one revolution while the member 11 is moving a distance of ten inches from point P to point P₁. To accomplish such motion of the drum and at the same time compensate for travel of the point of tape lead off along the drum, a particular relation of the drum, tape and path of the movable member is maintained. In particular, the arrangement preferably is such that the tape 12 is helically wound on the drum and each successive convolution is led off at exactly the helix angle. That is to say, the drum, in addition to being positioned with its axis 17 generally perpendicular to the path A—A in which the movable end 13 is guided, is positioned axially with the end of the tape helix, when fully wound up, disposed adjacent but spaced inwardly from the path A—A by an amount such that the unreeled portion of the tape is disposed at a constant included angle $a$ to said path. Although this spacing of the point of tape lead-off from the drum increases progressively as the tape is unwound, the angle $a$, due to the guiding of the free end of the tape, will remain fixed for all of the positions of the tape some of which are indicated by dot-dash lines in Fig. 1, the angle being equal to the helix angle of the tap wound on the drum. When so arranged the actual length of tape unwound from the drum, while the member 11 is moving between points P and P₁, will be $\sqrt{10^2 + \text{pitch}^2}$, the "pitch" being, of course, the distance between adjacent convolutions of the tape.

It will be observed that the angle between the drum axis 17 and the unreeled length of tape between the point 13 and the point of lead-off from the drum also remains constant for all positions of the movable member 11 and deviates from a right angle by an angle equal to the helix angle of the wound tape.

The foregoing calcaulations hold true only in the case of a tape of infinitesimal thickness. Actually the point, which moves about the drum a distance equal to the linear displacement of member 11, lies not on the drum periphery but on an imaginary circle concentric with the drum and having a diameter equal to that of the drum plus the thickness of the tape. For the sake of brevity this is hereinafter referred to as the "effective diameter" of the drum. In calculating the gear ratios and constructing the indicator scale, it is this effective diameter which must be used.

One particular advantage of the type of instrument described is the ease with which it may be adapted, with a minimum of change in the parts of the instrument itself, for installations requiring different ranges. In particular, if the gearing 18 is arranged so that the take-off shaft 21 will have some standard angular rotation for each unit of linear displacement of the movable member 11 (e. g. one revolution of shaft 21 for each inch of displacement of member 11), then all of the parts lying to the right of the gearing 18 in Fig. 1 may be of identical form for all instruments regardless of their ranges. The range requirements of a particular installation may be obtained by varying the length of tape and tape winding capacity of the drum 14 by changing either the length or diameter of the drum. Having chosen a drum diameter suitable for a particular installation, the gearing 18 is then calculated to afford the desired standard ratio noted between angular displacement of its output shaft 21 and linear displacement of the member 11.

Application to tool spindle

Referring now to Fig. 3 the invention has been shown as incorporated in the tool head of a milling machine and arranged to indicate the axial displacement of a face milling cutter 23 operating upon a work piece 23ª. As usual, the cutter 23 is carried by a spindle 24 journaled within a quill 25, which is splined against rotation and accurately guided within the tool head or housing 26 for axial adjustment in a rectilinear path. The guideway for the quill is indicated at 26ª (Figs. 4 and 5). The quill 25 is shifted axially, by power or by hand, by rotating a pinion 27 meshing with a rack 28 on the side of the quill. The tool head 26 is traversed horizontally along a rail 29 by lead screw 30, and a suitable driving motor 31 is provided in the head for the spindle 24.

For this application, the measuring device includes the drum 14 with its tape 12 helically wound as previously described. In the present instance, the drum shaft 17 is journaled in suitable anti-friction bearings within a sleeve 32 located within the head 26. This sleeve is adjustable about a horizontal axis on a pivot 33 (Fig. 4) to swing the drum 14 about this axis, for a purpose which will hereinafter appear. The adjustment is accomplished by a pair of opposed screws 34, threaded in brackets 34ª in the tool head, and bearing against opposite sides of the sleeve. A removable cover plate 35 on the tool head gives access to these screws.

The visual indicator 10 is located within a suitable housing 36 (Fig. 3) fixed on the end of the sleeve 32. The indicator face is thus exposed at the side of the machine tool head 26 and can be viewed conveniently by the operator at all times.

In the present instance, the tape 12 is fixed to a block or bracket 37 (Fig. 5) screwed on the side of the quill 25, and the cylindrical portion of the guideway 26ª in which the quill is slidable is slotted longitudinally as indicated at 38 to receive the tape. Thus, the guideway 26ª causes relative movement between the drum and the free end 13 of the tape in a plane which, except for the compensating adjustment later to be described, is normal to the drum axis. A sheet metal housing 39 covers this slot as well as the drum 14 so that the drum and tape are completely enclosed to exclude any dust or dirt. It will be appreciated that precision of operation requires hat no dirt shall become lodged between the tape and drum since even any small particles would bulge out the tape and destroy the accuracy of the instrument. As a further precaution, pads 40 of felt or the like (Fig. 5) are arranged to contact the faces of the tape adjacent the drum so as to wipe or scrape off any foreign matter which may come onto the tape while it is unwound.

It should be particularly noted that the tape 12 is attached to substantially the central portion of the quill 25 and also that the drum and tape are located on the interior of the tool head. Such an arrangement of the parts not only promotes compactness but in addition insures a substantial uniformity of temperature throughout the tape and drum unit as well as the machine tool parts including particularly the quill 25. In the event that the tape and drum are made of material having substantially the same coefficient of thermal expansion as the quill, any change in length of one, due to a change in temperature, will in such case be automatically compensated by a corresponding change in dimension of the other.

With the arrangement shown, the tape 12 is reeled in and out on the drum 14 as the quill 25 is moved down or up. The indicator 10 is thus actuated, in a manner heretofore described, to give a continuous visual reading of the exact location of the cutter 23.

Drum and tape unit

Accuracy of measurement is, in the present instrument, dependent directly upon the precision with which the effective diameter of the drum actually conforms to a selected value. If this effective diameter is inaccurate by only, say a 0.0001 of an inch, there will be an inaccuracy of several thousandths of an inch in the total registrations of the instrument since each convolution of the tape about the drum multiplies the error. To meet this difficulty, a novel form of drum and tape unit has been provided by means of which the extreme precision in dimensioning can be accomplished at comparatively low cost.

In the instant embodiment (Fig. 7) the drum 14 is fashioned in the form of a cylindrical sleeve with suitable interior webs 41 by which it is fixed to its shaft 17. The drum is preferably made of metal having a very low coefficient of thermal expansion such, for example, as Invar. Since the surface of the drum is of simple cylindrical form, it can be ground with extreme precision by simple and inexpensive grinding process. To form a guideway for the tape 12, a helical groove 42 (Fig. 8) is cut in the drum surface and a separately formed guide element comprising a helical spring 43 of square cross section is located in this groove. The spring can be expanded and slipped into place on the drum after the surface of the latter has been ground accurately to the desired diameter. The resilient engagement of the spring with the drum grooves locks it in place. It has been found that the clearance between the side edges of the tape 12 and the abutting walls of the spring 43 can be fairly large without impairing the accuracy of the instrument (Fig. 9). In fact, a clearance of 0.008 of an inch has been found suitable for the purpose so that the construction is satisfactory, even though the cross section of the spring 43 is not dimensioned with extreme accuracy.

With the coil spring 43 assembled on the drum 14 (Fig. 7) as described above, it will be seen that a helical groove is defined to receive the tape 12. The net result is to provide what amounts to a threaded drum with the roots of the threads ground to diameter with extreme precision. Since this grinding is, however, carried out on a simple cylindrical surface, rather than as a part of a thread-grinding operation, the cost is comparatively low.

As was previously noted, the thickness of the tape as well as the actual drum diameter must be taken into account in calculating the effective diameter of the drum, shown as diameter D in Fig. 7. This being the case, careful attention must also be given to tape thickness. The tape 12 is preferably made of flexible spring steel both because of its flexibility and its resistance to elongation under tension. Accurately sized steel tape suitable for the present purpose is commonly available on the market.

A thin flat tape is preferably utilized rather than a cable or wire of, say, round cross section. This is for the reason that the accuracy of the instrument depends in large part upon the exactness with which the tape conforms to the contour of the drum surface about which it is wound. The buckling or bulging of the tape as it encircles the drum, even though it be very slight, would result in an inaccuracy of several thousandths of an inch in the measurement registered. Consequently, maximum flexibility is imperative. A tape of the form described has the outstanding advantage that it combines maximum flexibility with maximum strength. A strip of rectangular cross section as shown has a minimum moment of inertia, as compared to a round cross section and, hence, greatest flexibility.

*Compensating adjustment*

Despite all precautions which may reasonably be taken in dimensioning the parts of the drum and tape unit as heretofore noted, there are likely to be some unavoidable variations in diameter from end to end of the drum and also variations in tape thickness from end to end of a particular piece of tape. These give rise to a cumulative error in registration over the range of an instrument.

Provision is made for distributing this otherwise cumulative error throughout the range of the instrument so that the error will be negligibly small at any particular point. Generally, this is accomplished by inclining the drum axis away from a perpendicular to the path of travel of the movable member 11 in a direction and by an amount corresponding to the compensation to be effected. It is for this purpose that the drum 14 is mounted to pivot at 33 (Figs. 3 and 4). The axis of pivotal adjustment lies at right angles to the drum axis and to the path A—A for the end of the tape (Fig. 1). Moreover, the pivotal axis is coincident with a radius of the drum passing through the center line of the tape at the latter's point of tangency to the drum for the first convolution of tape. With the drum pivotally mounted in the manner described, it can be swung toward or away from the portion of unreeled tape (Fig. 2). This bodily adjustment of the drum is, of course, accomplished by the screws 34 bearing against the sleeve 33.

In setting up the apparatus the tape is first reeled in and the indicator 10 set at its zero position. Then, the tape is reeled out to its full extent and the distance which its free end has moved is measured accurately in any suitable way such as the Johansson block method. This independently measured distance is then compared to the reading of the indicator 10 to see if the latter is correct. If there is some variation in diameter of the drum from end to end or variation in tape thickness, there may be an error in the indicator registration of a few thousandths of an inch. If such is the case, the drum 14 is tilted about its pivot 33 until the indicator 10 registers exactly the correct distance as measured by the Johannson block method. Incidentally, if the indicator reading is high when the tape has been unreeled to any desired point preferably the outermost limit of the range through which measurements are to be made with the drum axis disposed perpendicular to the path A—A of movement of the member 11, the axis would be tilted toward the free end of the tape, that is, downwardly as represented on an exaggerated scale by the lower dot-dash position in Fig. 2. The amount of such tilting is, of course, very small and the distance that the tape lead-off point is shifted along the drum axis is even smaller; consequently, the change in the tape angle $a$ above referred to is negligible. The angle therefore remains, for all practical purposes, constant and equal to the helix angle of the wound tape. Conversely, if the indicator reading, when the tape is unwound, is low, the angle between the drum axis 17 and the path A—A will be increased a proper amount beyond a right angle as represented by the upper dot-dash position in Fig. 2.

After having made the adjustment described above, the indicator 10, of course, registers properly when the tape is fully extended. It also registers properly when the tape is fully wound up; that is, in the zero position. In other words, the precision of the instrument is absolute at both ends of its range of registration so that the error heretofore noted is now distributed throughout the intermediate registrations of the instrument. In this way the error, which is at most only a few thousandths of an inch, is so divided that its effect at any particular point is negligible.

It will be seen from the foregoing that the result of tilting the drum axis away from a perpendicular to the path of travel of the movable element is to change the effective ratio of motion transmission between the movable element and the indicator which connection, in the present disclosure, includes the tape 12, the drum 14, and the drive gearing between the drum and the indicator 10. The sense and the amount of the change in the motion transmitting ratio corresponds to the rate of error accumulation due to the dimensional inaccuracies and the correction thus introduced is distributed progressively throughout the range of the movement to be measured.

It will be observed that during the compensating adjustment above described, the main movement of the point of lead-off of the tape from the drum is transversely of the drum axis. Because this point moves in an arc about the pivot 33, the position of the lead-off point shifts to a much smaller degree longitudinally of the drum. For errors of the small magnitude ordinarily involved, this shift is so extremely small that it does not change the angle $a$ to a measurable degree. Accordingly, the angle $a$ remains constant for all practical purposes in all positions of the movable support after the compensating correction has been introduced.

*Tape tensioning mechanism*

Precision measurement is best obtained by maintaining the tension in the tape 12 substantially constant. It will be readily appreciated that any sagging of the tape would completely destroy the accuracy of reading for the indicator 10. As was heretofore noted, the torque motor 16 (Figs. 1, 10 and 11) tends to turn in a direction to wind up the tape and therefore maintains a constant tension on the tape. With such a torque motor, the tape tension will not vary with changes in displacement of the end of the tape.

The torque motor 16 may be an ordinary shaded pole induction motor energized from any suitable source of single phase alternating current and its supply circuits are preferably interlocked with those of the machine tool to which the instrument is applied so that the torque motor 16 will be excited automatically whenever the machine tool is in use. The motor 16 may be conveniently mounted by a bracket 44 (Fig. 10) within the indicator housing 36 and as was heretofore noted, its rotor 22 is fixed to the shaft 21.

The left end (as viewed in Fig. 10) of the shaft 21 is connected to the drum shaft 17 through the gearing 18 which, in the present instance, consists of a gear 18ª fast on the shaft 17 and a pinion 18ᵇ fast on the shaft 21. At its opposite end the shaft 21 is connected to a central shaft 50ª for the indicator through the gearing 20, which includes a gear 20ª fast on the shaft 21 and a meshing pinion 20ᵇ fast on the shaft 50ª.

In addition to exerting a constant and continuous tension on the tape 12, the motor 16 also serves to take up any backlash in the gearing 18, which backlash would otherwise seriously affect the accuracy of the final indication owing to the fact that the drum movement is magnified many times while being transmitted to the indicator. Any backlash in the other gearing does not introduce errors of objectionable magnitude.

*Indicating mechanism*

The indicating mechanism 10 (Figs. 6, 10, 11 and 12) has been designed with a view to affording a continuous and easily observed reading over a long range. In the instant embodiment, a wheel type revolution counter 45 is provided having registration wheels 45ª and 45ᵇ for indicating primary units such as inches or centimeters (inches in the present instance) and a third wheel 45ᶜ for indicating tenths. The counter 45 is of conventional construction and need not be described in detail. For present purposes, it is sufficient to note that the wheel 45ᶜ rotates continuously, the wheel 45ᵇ makes one-tenth of a revolution for each full revolution of the wheel 45ᶜ, and similarly the wheel 45ª advances one-tenth of a revolution for each full revolution of the wheel 45ᵇ. Digits from zero to nine are marked on the peripheries of each of these wheels in the usual manner and they are exposed to view through registering apertures 46 in a dial plate 47. This dial plate is in turn covered by a glass bezel 48 on the front of the casing 36 (Fig. 1), the counter mechanism 45 being carried on a bracket 35ª mounted on the plate 36ª.

The reading in tenths of the primary units is much too coarse for use in precision work as, for example, in machine tool operation. In the present instance, means has been provided for registering such small increments as thousandths of the primary linear units despite the fact that the indicator is connected continuously in driven relation with a member which may move at a rapid traverse rate common in machine tools of, for example, forty feet per minute. This means comprises herein a supplemental open face dial type of revolution counter indicator which has been provided for showing displacement in increments of hundredths and thousandths of an inch. As shown in Fig. 6, this dial type indicator includes a circular graduated scale 49 on the dial plate 47, and a continuously revoluble pointer or needle 50. Each increment on the scale 49 represents one-thousandth of an inch so that the pointer 50 makes one complete revolution for each tenth of a revolution for the counter wheel 45ᶜ and for one-tenth of an inch of travel of the movable machine element or a point on the imaginary drum circle above referred to. The pointer 50 is quite light and easy to revolve, and in addition it is not connected directly to a counter wheel or the like, which it must actuate step-by-step during each revolution, so that even though the movable member 11 may be moved at a speed as high as forty feet per minute, there is no danger of injury to the instrument despite the small increments which it is adapted to register.

To correlate the readings on the counter wheel 45ᶜ with those of the pointer 50, a series of transverse lines 51 (Fig. 6) are placed on the periphery of the wheel extending through the center of each of the corresponding digits marked on it. These lines are adapted to register with a mark 52 on the dial plate. The operator is thus aware that the thousandths indicated by the pointer 50 must be added to the exposed digit on the wheel 45ᶜ lying above the line 51 until the latter registers with the line 52, and thereafter the reading indicated by the pointer is added to the next exposed digit. For example, the total reading on the instrument as shown in Fig. 6 is 18.660 inches.

As to the drive connections, the counter wheel 45ᶜ is connected to the shaft 21 without the interposition of any speed change mechanism since, as was heretofore noted, this shaft is arranged, by proper selection of gearing 18, to make one revolution for each inch of tape unreeled from the drum 14. In the present embodiment (Figs. 10, 11 and 12), a bevel gear 53 fast on the wheel 45ᶜ meshes with a bevel gear 54 loosely journaled on the shaft 21. This latter gear is fashioned on the hub of the gear 20ª and which also constitutes the driven member of the clutch 19. A compression spring 56 urges this driven member 20ª into face-to-face frictional engagement with a cup-shaped clutch driving member 57 fast on the shaft 21. So long as the clutch 19 remains engaged, the counter wheel 45c is thus driven in synchronism with the shaft 21. The step-by-step advancing motion of the other two counter wheels 45b and 45a is imparted to them from wheel 45c in the usual manner for such devices.

A separate driving mechanism for the pointer 50 is provided between it and the shaft 21. In the present instance, the pointer is fast on the end of the shaft 50a (Fig. 10). This latter shaft is driven through the gearing 20 at a speed ten times that of the shaft 21 so that the pointer 50 will make one complete revolution for each tenth of an inch of tape unreeled from the drum 14.

Resetting of indicator

Occasion very frequently arises for changing the reference point from which measurements are to be made in using an instrument of the type described. For example, when applied to a machine tool as in Fig. 3, measurements may be made from several different reference cuts. Provision is made for setting at least the fine increment indicator to zero so that the subsequent measurements can be made by direct readings from the instrument rather than by making a mental calculation each time to subtract the reference cut reading from that of the indicator.

It is to accommodate such a resetting operation that the clutch 19 (Figs. 1 and 11) is interposed between the indicator 10 and the drum 14. This clutch must, however, be of a type in which its driving and driven members can engage in any relative angular position whatsoever, a friction type clutch being employed in the present instance (see Fig. 11) comprising driving and driven members 57 and 20a which are normally urged into gripping engagement at their adjacent surfaces by a compression spring 56 which encircles the shaft 21 and acts between the member 20a and a stop on the end of the shaft. The clutch also serves as an overload release which prevents the tape 12 from being stretched or broken if an operator inadvertently changes the indicator setting without previous disengagement of the clutch.

During the resetting operation, it is desirable that the shaft 21 be held against rotation so that the tape tension will not be changed and an error introduced as an incident to such resetting. For this purpose a braking plunger 58 (Fig. 11) is arranged for frictional engagement with the periphery of the driving member 57 of the clutch. A compression spring 59 normally urges the plunger out of engagement with the clutch member 57, this plunger being arranged for axial sliding movement within a block 60 screwed on the supporting plate 36a. The head of the plunger extends outside the casing in the form of a convenient push button 58a so that the plunger may be pushed in axially to bring the brake shoe 58b into engagement with the clutch member 57, thus holding it firmly against rotation.

To reset the dial pointer 50, the operator pushes in the plunger 58 to hold the clutch driving member 57 against rotation. Then, he grasps a knurled head 60a (Figs. 10 and 11) fast on the end of the shaft 50a and turns the pointer 50 to the desired position, usually zero, the clutch 19 slipping to permit such movement. The wheel counter 45c, of course, is turned slightly during this adjustment. Finally, the brake is released, the clutch parts being then engaged with the pointer in its reset position.

Similarly, if it is desirable to reset the wheel counter mechanism 45, the operator grasps a second knurled knob 61 on the outer end of a shaft 62, and presses the latter axially inward (Fig. 10). The inner end of this latter shaft carries a bevel gear 63 arranged to engage the gear 54 so that upon rotation of the knob 61 the counter mechanism can be turned to the desired position by slipping of the clutch 19. The dial pointer 50 also turns during such resetting. A spring 62a encircling the shaft 62 urges it outward to the normal disengaged position for the gear 63.

Brief resumé of operation

When the measuring apparatus is installed in a machine like that of Fig. 3, it is first of all adjusted as by the adjustment screws 34 in order to distribute throughout the range of the instrument any errors arising from variations in diameter of the drum from end-to-end, or variations in tape thickness. The drum and tape unit is, of course, fashioned in the manner heretofore described so as to obtain maximum accuracy in its dimensions prior to its installation in the machine.

In the operation of the machine, the operator ordinarily starts in on a new work piece by taking a reference cut, usually for roughing. He then resets the indicator 10 to zero, as described, by pressing in the brake plunger 58 (Fig. 10) and rotating the knobs 60a and 61 to return the respective revolution counters 45 and 50 to their zero positions. Thereafter, to locate the milling cutter 23 (Fig. 3) at successive positions of axial displacement required, he simply traverses the quill 25 until the indicator 10 (Fig. 6) shows that the desired position has been reached. The reading afforded by the instrument is continuous and precise throughout long ranges so that through the use of ordinary jogging controls the cutter can be brought precisely to the desired position.

As the quill 25 is traversed, the tape 12 is wound in or out on the take-up drum 14, depending upon the direction of quill movement, the drum being yieldably biased at all times by the torque motor 16 to reel in the tape. Since the drum is constantly connected to the indicator 10, the reading of the latter gives a continuous indication of a machine tool element's position.

The operator can, of course, reset the indicator 10 to zero, or to any other desired position whenever required. In this connection, it is sometimes easier to predetermine the measurement before movement of the machine element. To do this, the instrument is first set manually to indicate the exact distance desired to be measured and then the machine element is shifted in a direction to reel in the tape 12. The arrival of the element at the exact position required will be indicated by a zero reading on the instrument.

Application to parts difficult of access

One particular virtue of the novel measuring device herein disclosed is that the tape 12, because of its flexibility and small cross sectional size, may be led through intricate machine structures and attached to movable parts which are difficult of access. By way of example, a measuring device embodying the invention has been shown (Fig. 13) as applied to an axially movable quill 65 in a milling machine head 66. This quill supports a revoluble spindle 67 carrying a milling cutter 68 in the usual manner. Because of space limitations it may not be possible to mount the tape winding drum adjacent the path of the quill 61 and, in addition, requirements of rigidity for the quill mounting may preclude its being slotted, as was the case of the mounting for the quill 25 in Fig. 3. In such case the tape 12 is led over idlers 69 and down to a winding drum located at the side of the head 66 where ample space is available.

Figure 15:
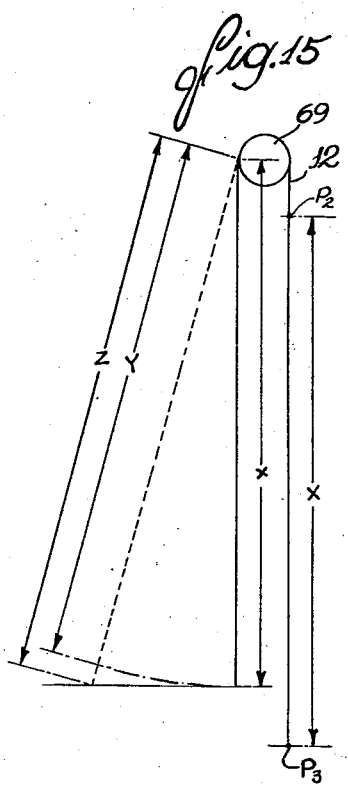
Fig. 15 is an explanatory diagram for the device of Fig. 13.

Although the use of idlers as described above to direct the tape 12 into comparatively inaccessible machine parts adds greatly to the versatility of use of the measuring device, it introduces other difficulties with respect to precision of operation. In the installation of Fig. 13, for example, the tape 12 is helically wound about a drum connected to an indicator 10 as before. In this case, however, it will be seen as the tape is unwound from the drum, the length of tape lying between the idlers 69 and the drum gradually increases. In other words, as the end of the tape moves from position, $P_2$ (Fig. 15) to $P_3$, through a distance $x$, the portion of tape between the drum and the idler 69 increases in length from $y$ to $z$. This would, of course, introduce a serious error in the readings of the indicator 10.

Figure 14:
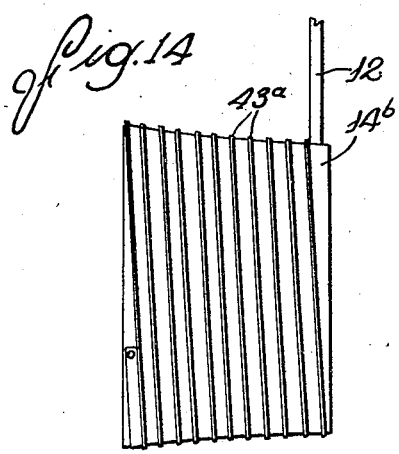
Fig. 14 is an enlarged side elevation of the drum and tape unit included in the device of Fig. 13.

To eliminate the error in measurement which would otherwise result from the action described above, a drum $14^b$ (Fig. 14) of special contour is utilized. This drum may be made from Invar as before and the helical channel for receiving the tape defined by a spring $43^a$ (Fig. 14). The drum is, however, formed with a curved taper from end to end, the change in contour being calculated so that the portion of the tape lying between the drum and the idler will remain constant as successive convolutions of the tape are unwound. It will be noted too that there is some change in angular relation of the tape to the drum as it is unwound, so that it does not exactly match with the helix angle of the tape-receiving groove on the drum periphery. This angular relation has been shown in exaggerated form in Fig. 14. By providing a substantial clearance of, say, 0.008 of an inch between the edges of the tape and the sides of the spring $43^a$ this change in angular position of tape is permitted without interference with its proper winding and unwinding.

The adaptation of the invention as shown in Figs. 16 and 17 forms the subject matter of my copending application Serial No. 401,940, filed July 11, 1941.

*Tape protection*

Figs. 16 and 17 illustrate the manner of applying the improved measuring device to the movable work table 77 of a milling machine with provision for protecting the tape so that it is kept clean and free from dirt, chips or foreign matter that would prevent its reeling up in exact conformity to the drum contour. For such an application, the drum 14 would preferably be mounted at one end of the bed structure 78 along which the table slides in ways 80 which, in this instance, constitute the means for guiding the free end of the tape and thus maintain the proper constant angular relationship between the drum axis and the unreeled portion of the tape 12. The tape 12 is led along a wide channel between the bedways with its end attached to an arm 79 disposed close to the upper bed surface 73 and projecting horizontally from a bracket 75 depending from and fixed to the underside of the table, preferably near the longitudinal center thereof.

To protect the tape, an elongated plate 70 of a width corresponding to the travel of the tape along the drum throughout the range of table movement, is bolted to the bed so as to overlie the tape. The space between the free edge of the plate and the bed surface 73 is sealed by a strip 72 of yieldable material, such as rubber, seated in a channel 71 attached to the plate.

As the table moves lengthwise of the tape enclosure, the arm 79 rides along beneath the free edge of the strip 72. Due to its resiliency, the strip 72 presses down firmly against the wall 73 except at the point where it is locally displaced by the arm, and accordingly the chamber 74, in which the tape 12 is housed, is effectually sealed against the entrance of dirt or other foreign material which might lodge on the tape. This kind of protection may be provided for the tape when the measuring device is applied to any other movable machine element.

From the foregoing it will be apparent that the improved measuring device possesses numerous outstanding advantages. By virtue of the continuous engagement of the driving connection between the drums and indicators, the device measures all movements of the movable member with full accuracy, and this in spite of high traverse speeds that are frequently used. Because of the continuous indication, coupled with the provision for manual reset, no complicated manipulations or calculations are involved in making a measurement and labor costs are accordingly reduced. For example, time studies made in actual service use of a milling machine show that the same skilled operator using the improved measuring device is able to make a set-up for a finishing milling cut in one-sixth the time that is required using Johansson blocks of the kind commonly used in machine shops, substantially the same accuracy being obtained in both cases.

There is no possibility of error being introduced by the presence of dirt or foreign material on the parts.

The present measuring device involves the conversion of the movements of the machine element into rotary motion of the indicator parts and thus is readily adaptable to remote indication. This may be accomplished, for example, by driving a so-called Selsyn type transmitting motor from the shaft 21 and utilizing an associated Selsyn type receiving motor operating through a normally engaged manually disengageable friction clutch to drive the pointer 50 of a remotely located indicating instrument directly and to drive appropriate speed reduction gearing for actuating the wheel counters.

Finally, the instrument, with the extreme accuracy required in the operation of machine tools, may be manufactured at a low cost which is not increased in proportion to changes in the range of the instrument.

I claim as my invention:

1. In a precision measuring device, the combination of a rotatable drum having a precision form peripheral surface which is a surface of revolution about the axis of rotation of the drum, a structurally separate helical member encircling said drum and fixed thereon to define between its convolutions a helical channel with an accurately formed root on the drum periphery, a thin flexible element wound about said drum in said channel with one end fixed to the drum and the other arranged to be unreeled therefrom, an indicator, and means driven by said drum for actuating said indicator in response to drum rotation.

2. For use in a device of the type described, a tape reel comprising a rotatable metal drum having a precision formed cylindrical surface with a helical groove therein, a helical spring member encircling said drum and fitting in said groove to define between its convolutions a helical channel with an accurately formed root on the drum periphery.

3. In a precision measuring instrument of the type described, the combination of a drum and tape unit comprising a rotatable drum presenting a peripheral helical groove having a flat and accurately formed root surface, a tape helically wound about said drum in said groove with one end anchored to the drum and the other arranged to be pulled from it to rotate the drum, said tape being fashioned from a strip of flat and very thin flexible sheet metal to conform closely to said root surface when wound about the drum while being subject to minimum elongation when placed under tension.

4. In a precision instrument for measuring the displacement of a movable member, the combination of a revolution counter type of indicating mechanism calibrated in terms of linear measure and including a shaft, a rotatable drum of accurately formed exterior diameter, a gear connection interposed between said shaft and drum, the ratio of said gear connection being such as to revolve said shaft through precisely one revolution in response to the displacement through a selected unit of linear measure of a point lying on a circle concentric with said drum and of predetermined diameter, and a thin flexible tape helically wound about the drum with one end anchored to the drum and the other to a movable member whose displacement is to be measured, the thickness of said tape being precisely the difference between the actual peripheral drum diameter and said predetermined drum diameter.

5. In a measuring device, the combination of an indicator mechanism of the revolution counter type calibrated in terms of linear measure, a drive shaft for said mechanism, a rotatable drum, a flexible line helically wound about the drum and anchored at one end to the same with the other end of the line arranged to be attached to a member whose displacement is to be measured, and means including a replaceable gearing interposed between said shaft and said drum for rotating said shaft precisely one revolution for each displacement of said other end of said line through a unit of linear measure, whereby said mechanism may be conditioned through choice of a suitable ratio of said replaceable gearing for attachment to drums of different diameters.

6. A measuring device comprising, in combination, a revoluble take-up reel having a flexible line wound about it and anchored at one end to the reel with the other end free to be unreeled from the reel and adapted for attachment to a movable member, a revolution counter indicating mechanism including a shaft, means including gearing connecting said shaft and said reel, and means including an electric motor for yieldably biasing said shaft for rotation in one direction with a substantially constant torque not only to maintain a constant tension in said line but also to take up backlash play in said gear connection.

7. A device of the type described comprising, in combination, a revoluble take-up reel having a flexible line wound about it and anchored at one end to the reel with the other end free to be unreeled from the reel and adapted for attachment to a movable member, indicator means actuatable in response to reel rotation, gearing for transmitting the motion of said reel to said indicator means at increased speed, and an electric motor for yieldably biasing an intermediate element of said gearing in one direction with a substantially constant torque not only to maintain a constant tension on said line but also to take up backlash in said gearing.

8. A measuring device comprising, in combination, a rotatable take-up reel, a flexible line wound about said reel and arranged with one end anchored thereto and the other arranged to be unreeled from it, a revolution counter calibrated in terms of units of measure and including a rotatable driving member, means for manually resetting said revolution counter, means for connecting said driving member and said reel including a friction clutch having frictionally engageable driving and driven elements, and means including a brake for holding the driving element of said clutch against movement during actuation of said manual reset means to prevent variations in line tension during the resetting operation.

9. In a device of the type set forth, the combination with a take-up reel having a flexible line thereon and arranged to be unreeled from it, of a housing enclosing the extended portion of the line, said housing having one side closed by a flap of yieldable material, and a member movable along said housing and connected to said line within said housing, said member extending through said housing along the free end of said flap.

10. In a measuring apparatus, the combination of an indicator mechanism, a rotatable drum connected in driving relation with said indicator mechanism, means defining a helical groove on the drum periphery, a flexible line wound about said drum in said groove with one end anchored to the drum and the other led freely from the drum and attached to a movable member whose position is to be indicated, the portion of said member to which the line is attached being movable along a predetermined path, means for biasing the drum to reel in the line, and means supporting said drum in position to maintain the unreeled line adjacent the drum at substantially the true helix angle of said groove relative to said path in all positions of said member along said predetermined path.

11. Apparatus for measuring the displacement of a member movable along a rectilinear path having, in combination, an indicator, a rotatable drum having a driving connection with said indicator and held against axial movement, a flexible line helically wound around said drum at a constant helix angle with one end led from the drum and fastened to said member, and means supporting said drum in a position to maintain a constant angle between the unreeled portion of the line and said path in all positions of said member.

12. For use in a device of the type described, a tape take-up reel comprising a rotatable drum having a precision formed peripheral surface which is a surface of revolution about the axis of rotation of said drum, said drum surface having a helical groove of constant lead therein, and a member encircling said drum and fitting in said groove to define between its convolutions a helical channel with an accurately formed root on the drum periphery.

13. A measuring device comprising, in combination, a revoluble member, means for revolving said member through an angular distance proportional to the displacement of a second movable member whose position is to be indicated, a revolution counter calibrated in terms of units of measure and including a rotatable driving member, means for connecting said driving member in driven relation with said revoluble member, said last mentioned means including driving and driven elements constantly urged into frictional engagement, manually operable means for resetting said counter, and means for releasably holding said driving element of the connecting means against rotation due to drag exerted thereon by rotation of the driven element incident to resetting of the counter.

14. A measuring device comprising, in combination, a revoluble member, means for revolving said member through an angular distance proportional to the displacement of a second movable member whose position is to be indicated, a revolution counter including a rotatable driving member, means for connecting said driving member in driven relation with said revoluble member but permitting independent rotation of said driving member relative to the revoluble member when the latter is positively held against rotation, means for resetting said counter, and means for releasably holding said revoluble member against rotation during the operation of said resetting means.

15. Measuring apparatus comprising, in combination, a rotatable drum, a flexible line having a portion helically wound in a single layer and at a constant helix angle around said drum for rotation therewith, the remainder of said line being unreeled, means providing an elongated guideway, a member movable along said guideway and guided thereby, a second member stationary relative to said guideway, means connecting a point on said unreeled portion to one of said members, means rotatably supporting said drum on the other of said members and in axially fixed position relative to said guideway, with the drum axis extending transversely of said guideway and with the unreeled portion of said line disposed during relative movement of said members at a constant included angle relative to said guideway equal to said helix angle, means acting to rotate said drum and to reel in said line, and means controlled by the rotation of said drum during winding and unwinding of said line for indicating the extent of movement of said movable member.

16. Apparatus for measuring the relative movement between two members along a predetermined path comprising, in combination, a drum rotatably mounted on one of said members, a flexible line wound helically around the drum with a point on the unreeled portion of the line connected to said other member whereby said line is wound onto and unwound from the drum during relative movement between said members in opposite directions, means acting during such relative movement to maintain the drum axis and the unreeled portion of said line adjacent said drum at a constant angle deviating from a right angle by an angle equal to the helix angle of the wound line, and means tending to rotate said drum and reel in said line while maintaining the latter taut.

17. Measuring apparatus having, in combination, a movable supporting member, means guiding said member for movement along a predetermined plane, a second supporting member stationary relative to said movable member, a drum, a flexible line having one portion wound helically around said drum with its end anchored to the drum, the other portion being led off from the drum, means connecting said last mentioned portion of said line to one of said members at a point disposed in said plane, means rotatably supporting said drum on the other of said members with the drum axis extending transversely of said plane and with the point of lead-off of the line from said drum spaced from the plane and moving progressively away from the plane to maintain a constant angle between the plane and the unreeled portion of the line during unwinding of the line by relative movement between said members, and means tending to wind up said line on the drum and maintain the line taut.

18. A device of the type described comprising, in combination, a rotatable drum, indicator means connected in driven relation with said drum, a flexible line wound helically about said drum and arranged with one end anchored to the drum and the other led freely from it to revolve the drum as the free end of said line is reeled in or out, means supporting said drum for pivotal movement about an axis normal to its axis of rotation and passing through a point of tangency between the drum periphery and the last convolution of the line when the line is reeled in, and means for adjusting the position of said drum about said pivotal axis to distribute the effect of any variations in drum diameter or line thickness throughout the range of registration of the device.

19. A device of the type described comprising, in combination, a sleeve having a shaft journaled centrally therein, a casing at one end of said sleeve having an indicating device therein connected in driven relation with said shaft, a drum revolubly mounted at the other end of said sleeve coaxial with said shaft and connected in driving relation with the same, a flexible line wound helically about said drum and arranged with one end anchored to the drum and the other led freely from the drum to revolve the same as the free end of the line is reeled in or out, and means supporting the assembly set forth for pivotal movement about an axis normal to the axis of drum rotation and passing through the point of tangency between the drum and the last convolution of said line.

20. In a device of the type described, the combination of a revoluble take-up reel having a flexible line helically wound about the same with one end anchored to the reel and the other free to be unwound from it and thereby revolve the reel, the portion of the line leaving the reel having an endwise motion in a direction substantially normal to the rotational axis of the reel, indicator means responsive to angular rotation of the reel, and means by which the reel may be adjusted about an axis transverse to its axis of rotation to distribute throughout the range of the device errors otherwise arising from variations in reel diameter.

21. In a device of the type described, the combination of a revoluble take-up reel having a flexible line helically wound about the same with one end anchored to the reel and the other free to be unwound from it and thereby revolve the reel, the portion of the line leaving the reel having an endwise motion in a direction substantially normal to the rotational axis of the reel, indicator means responsive to angular rotation of the reel, and means supporting said reel for tilting adjustment longitudinally of the path of travel of the portion of the line leaving the reel.

22. Measuring apparatus having, in combination, a rotatable drum, a flexible line having an unreeled portion and a portion helically wound on said drum in a single layer, means tending to rotate said drum and to reel in said line while maintaining the latter taut, means controlled by the rotation of said drum during winding and unwinding of the line for indicating the extent of rotation of the drum in units of measure, two supports guided for movement relative to the other along a rectilinear path, means on one of said supports connected to the unreeled portion of said line at a point spaced from the drum, and means on the other of said supports rotatably supporting said drum with the unreeled portion of the line intersecting said path at a constant angle in all positions of the movable support and with the drum axis inclined relative to a perpendicular to said path in a direction and by an amount sufficient to compensate for cumulative dimensional inaccuracies in the drum and line and cause said indicating means to register the correct displacement of said movable support at spaced positions in its range of movement.

23. Measuring apparatus having, in combination, a rotatable drum, a flexible line helically wound on said drum, means tending to rotate said drum and to reel in said line while maintaining the latter taut, means controlled by the rotation of said drum during winding and unwinding of said line for indicating the extent of rotation of the drum in units of measure, two members guided for movement relative to each other along a predetermined path, one member being connected to the free end of the unreeled line and the other member rotatably supporting said drum, and means for causing the length of unreeled line paid out per unit of movement of the movable member along said path to be changed progressively by an increment sufficient to cause said indicating means to register correctly the displacement of said movable member in spite of the oversize or undersize of the drum.

24. Measuring apparatus having, in combination, a rotatable drum, a flexible line helically wound on said drum, means tending to rotate said drum and to reel in said line while maintaining the latter taut, two supports guided for movement relative to each other along a predetermined plane, means connecting one of said supports to the free end of the unreeled line, and means rotatably supporting said drum with its rotational axis extending transversely of said plane but tilted away from a perpendicular thereto whereby the amount of line paid out per unit of movement of the movable support changes progressively as the line cross-travels along the drum.

25. Measuring apparatus having, in combination, a rotatable drum, a flexible line helically wound on said drum, means tending to rotate said drum and to reel in said line while maintaining the latter taut, two supports guided for movement relative to each other along a predetermined plane, one support being connected to the free end of the unreeled portion of the line and the other support rotatably supporting said drum with its rotational axis extending transversely of said plane, and means associated with said supports and selectively adjusted to vary the length of said line that is unreeled per unit of movement of the movable support in different parts of its movement along said path.

26. Apparatus of the character described comprising, in combination, a rotary drum, a line wound thereon at a constant helix angle, means for effecting relative movement between the free end of said line and the drum axis along a fixed path to maintain a constant angle equal to said helix angle between said path and the unwound portion of said line adjacent to said drum, and means for mounting said drum with its axis inclined from a perpendicular to said path at such an angle that the amount of said line paid out on unreeling thereof per unit of said relative movement will be increased or decreased by an amount which compensates for the oversize or undersize of the diameter of said drum.

27. Apparatus of the character described comprising, in combination, a rotary drum, a line wound thereon at a constant helix angle, means for effecting relative movement between the free end of said line and the drum axis along a fixed path to maintain a constant angle equal to said helix angle between said path and the unwound portion of said line adjacent to said drum, and means for uniformly varying the amount of said line paid out or reeled in per unit of said relative movement by an amount which compensates for the oversize or undersize of the drum.

28. Measuring apparatus having, in combination, a rotatable drum, a flexible line helically wound on said drum, two members mounted for movement relative to each other along a predetermined path, one member being connected to the unreeled portion of said line and the other member rotatably supporting said drum, an indicator having an element driven by the rotation of said drum, and means for causing the movement of said indicator element per unit of movement of said movable member along said path to be changed progressively by an increment sufficient to compensate for inaccuracy in the size of said drum and thereby cause the element to register correctly the displacement of said movable member.

29. Measuring apparatus having, in combination, a rotatable drum, a flexible line helically wound on said drum, two members mounted for movement relative to each other along a predetermined path, one member being connected to the unreeled portion of said line and the other member rotatably supporting said drum, an indicator having a movable element for registering the relative movement between said members, means for driving said indicator element in accordance with the rotation of said drum, said driving means, said drum, and said line constituting a motion-transmitting connection between said indicator element and said movable element, and means associated with said connection and operable during winding and unwinding of said line to cause the ratio of transmission of the motion between said movable member and said indicator element to be changed progressively in a sense and at a rate sufficient to compensate for inaccuracy in the size of said drum whereby said indicator registers the correct displacement of said movable member in all positions of the latter along said path.

30. Measuring apparatus having, in combination, a rotatable drum, a flexible line helically wound on said drum, two members mounted for movement relative to each other along a predetermined path, one member being connected to the unreeled portion of said line and the other member rotatably supporting said drum, an indicator having a movable element for registering the relative movement between said members, and means for driving said indicator element in accordance with the rotation of said drum, said driving means, said drum, and said line forming a motion-transmitting connection between said indicator element and said movable element having a driving ratio which, during displacement of said movable member, changes progressively in a sense and at a rate sufficient to compensate for inaccuracy in the size of said drum whereby said indicator registers the correct displacement of said movable member in all positions of the latter along said path.

ERIC S. GUTTMANN.